(12) United States Patent
Beaufort et al.

(10) Patent No.: US 8,336,812 B2
(45) Date of Patent: Dec. 25, 2012

(54) ENGINE ATTACHMENT FOR AN ASSEMBLY SYSTEM MOUNTED BETWEEN AN ATTACHMENT STRUT AND AN AIRCRAFT ENGINE

(75) Inventors: Jacques Beaufort, Blagnac (FR); Jean-Francois Dumont, Thil (FR)

(73) Assignee: Airbus Operations SAS, Toulouse (FR)

( * ) Notice: Subject to any disclaimer, the term of this patent is extended or adjusted under 35 U.S.C. 154(b) by 1032 days.

(21) Appl. No.: 11/817,837

(22) PCT Filed: Mar. 15, 2006

(86) PCT No.: PCT/EP2006/060745
§ 371 (c)(1),
(2), (4) Date: Mar. 21, 2008

(87) PCT Pub. No.: WO2006/097484
PCT Pub. Date: Sep. 21, 2006

(65) Prior Publication Data
US 2008/0169378 A1 Jul. 17, 2008

(30) Foreign Application Priority Data
Mar. 18, 2005 (FR) ..................................... 05 50700

(51) Int. Cl.
*B64D 27/26* (2006.01)
*F02C 7/20* (2006.01)

(52) U.S. Cl. .............................. 244/54; 248/554; 60/797
(58) Field of Classification Search ................... 244/54, 244/55; 248/554–557; 60/796, 797
See application file for complete search history.

(56) References Cited

U.S. PATENT DOCUMENTS

| 5,474,258 A | 12/1995 | Taylor et al. |
| 5,871,176 A | 2/1999 | Demouzon et al. |
| 6,347,765 B1 * | 2/2002 | Jule et al. ........................ 244/54 |

FOREIGN PATENT DOCUMENTS

| EP | 0 997 653 | 5/2000 |
| EP | 1 486 418 | 12/2004 |

* cited by examiner

*Primary Examiner* — Joseph W Sanderson
(74) *Attorney, Agent, or Firm* — Oblon, Spivak, McClelland, Maier & Neustadt, L.L.P.

(57) ABSTRACT

An engine attachment for an assembly system configured to be mounted between a rigid structure of an attachment strut of an aircraft engine and an engine. The attachment includes a main body, a rudder bar on an articulated mounting on the main body by a hinge pin, and two thrust absorption rods each with one end connected to the rudder bar. The main body includes a first main brace and a second main brace superimposed on the first brace. The hinge pin is formed by a first portion and a second portion, wherein the first portion is made in one piece with the first brace and the second portion is made in one piece with the second brace. Furthermore, the braces define a stop limit surface configured to limit rotation of the rudder bar.

12 Claims, 7 Drawing Sheets

ENGINE ATTACHMENT FOR AN ASSEMBLY SYSTEM MOUNTED BETWEEN AN ATTACHMENT STRUT AND AN AIRCRAFT ENGINE

TECHNICAL FIELD

This invention relates generally to an engine attachment of an assembly system designed to be mounted between a rigid structure of an attachment strut of an aircraft engine and an engine, and more particularly but not exclusively to a front attachment designed to absorb the efforts which are exerted in the longitudinal, transversal and vertical directions of the engine.

The invention also relates to an assembly system designed to be mounted between a rigid structure of an attachment strut of an aircraft engine and an engine, wherein this system can be used regardless of the position of the engine with respect to that of the attachment strut.

STATE OF THE PRIOR TECHNIQUE

An attachment strut of an aircraft is provided to form the connection interface between an engine and a wing of the aircraft. It allows the efforts generated by its engine to be transmitted to the structure of this aircraft, and also allows the passage of fuel, electricity, hydraulics and air between the engine and the aircraft.

In order to ensure the transmission of the efforts, the strut comprises a rigid structure, for example of the "caisson" type, which is to say formed by the assembly of upper and lower beams and connected to one another by means of transversal ribs.

Typically, an assembly system is mounted between the engine and the rigid structure of the strut, and generally comprises at least two attachments, generally one front attachment and one rear attachment.

Furthermore, this assembly system comprises a device for absorbing the thrust efforts generated by the engine, wherein this device may for example be integrated into the front attachment. In the prior art, this device is generally in the form of two lateral rods connected on the one hand to a front part of the central housing of the engine, and on the other hand to a main body of the front attachment.

Figure 1:
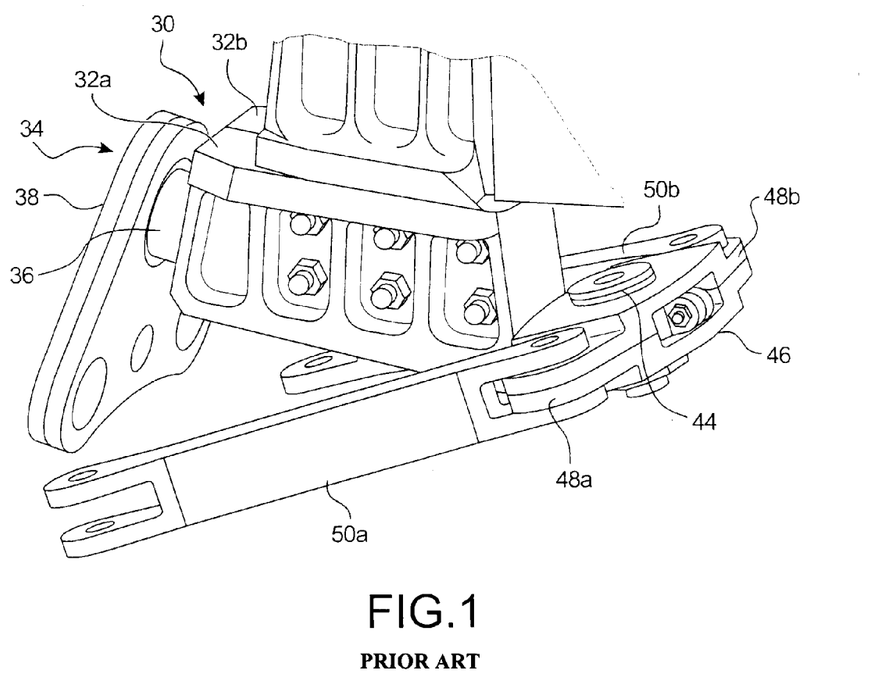
FIGS. 1 and 2, already described, show a front engine attachment known from the prior art.
Figure 2:
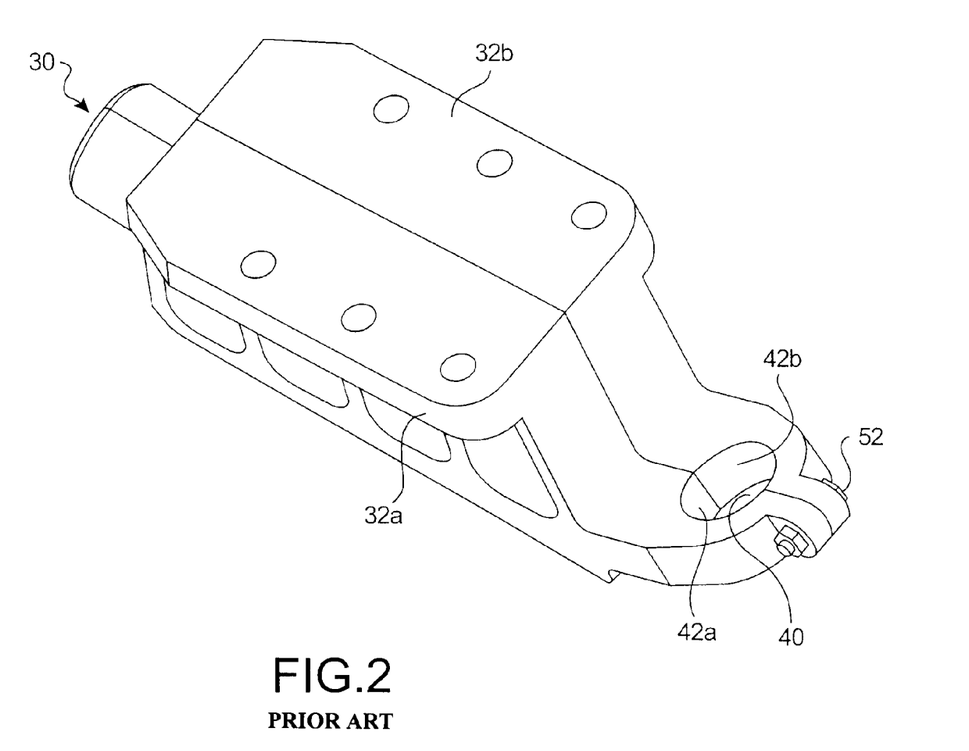

In reference to FIGS. 1 and 2, a front engine attachment known to the prior art can be seen, wherein this front attachment is designed to absorb the efforts exerted in the longitudinal, transversal and vertical directions of the engine.

More precisely, this front attachment comprises a central body 30 designed to be mounted rigidly at one front part of the rigid structure of an attachment strut, wherein this central body 30 is composed of two main superimposed braces 32a, 32b in a transversal direction of the attachment. The number of braces is doubled for safety reasons, so that in the event of one of these two main braces breaking, the other can absorb the efforts for a given time.

At the front of the main body 30, there is a housing 34 designed to absorb simultaneously the efforts in the transversal and vertical directions of the engine, wherein this housing, which is usually called "Monoball", comprises a hinge pin 36 attached to the main body 30, as well as a double triangular brace 38 articulated on this pin 36 facing in the longitudinal direction of the attachment.

As can be seen in FIG. 2, the main body 30 has, in one rear part with a much thinner section, a bearing 40 designed to house the hinge pin which provides the connection between the body 30 and a rudder bar of the thrust absorption device.

To this end, it should be noted that the bearing is jointly defined by a semi-cylindrical surface 42a of the main brace 32a, as well as by a semi-cylindrical surface 42b of the main brace 32b.

In FIG. 1, it is shown that a hinge pin 44 allows the rudder bar 46 to be attached on the main body 30, wherein this rudder bar 46, essentially comprises a double brace, with two lateral ends 48a, 48b upon which are respectively mounted the rear ends of two thrust absorption rods 50a, 50b of the efforts generated by the engine.

This engine attachment is known in the prior art and firstly has a disadvantage in that the rear parts of the main braces have to be attached to one another downstream of the bearing formed by them, in order to ensure the geometry of this bearing. This attachment, for example created using a bolt, is on the one hand a constraint in that it is in addition to the attachments already required to ensure that the two main braces are held mechanically, and on the other hand detrimental in that it doesn't incorporate a double safety system that is needed to provide the safety level mentioned above.

In other words, in the event of the bolt 52 shown in FIG. 2 breaking, there are no means on the front attachment which allow the geometry of the bearing 40 to be ensured and to maintain the hinge pin 44 inside the latter, given that the two rear parts of the braces 32a, 32b are then free to separate from one another.

Moreover, the need to provide this rear part exclusively to hold the hinge pin of course implies that the overall weight and size of the main body are not fully optimised. Furthermore, the position of the bearing housing the hinge pin is very much pushed back and requires the presence of two very long rods, which are also detrimental in terms of the overall size and weight of such a front attachment.

Finally, it should be noted that the difference in thickness between the central part and the rear part of the attachment body causes difficulties in transferring the efforts in the attachment.

OBJECT OF THE INVENTION

The object of the invention is therefore to propose an engine attachment for an assembly system designed to be mounted between a rigid structure of an attachment strut of an aircraft engine and an engine, as well as such an assembly system, overcoming at least partially the disadvantages mentioned above related to the products of the prior art.

To achieve this, the first object of the invention is an engine attachment for an assembly system designed to be mounted between a rigid structure of an attachment strut of an aircraft engine and an engine, wherein this attachment comprises a main body, a rudder bar on an articulated mounting on the main body, thanks to a first hinge pin, as well as two thrust absorption rods each disposing of a rear end connected to the rudder bar, wherein the main body is composed by means of a first main brace and a second main brace superimposed on the first. In the invention, the first hinge pin is composed by a first portion of pin and a second portion of pin, wherein the first portion of pin is made in one piece with the first main brace, and the second portion of pin is made in one piece with the second main brace. Furthermore, the first and second main braces jointly define a stop limit surface capable of limiting the rotation of the rudder bar around the first hinge pin.

Consequently, the invention proposed permits an engine attachment to be obtained whose main body no longer requires the presence of a bearing in the rear part as was the case in the embodiments of the prior art, given that the hinge pin of the rudder bar is directly incorporated onto this main body. Consequently, it is the entire thinned rear part of the section of the main body that can be eliminated, which naturally leads to an advantageous reduction in the overall weight and size of this body.

Furthermore, eliminating the rear part with the thinned section allows the position of the hinge pin to be moved forward with respect to the position previously used. Consequently, the length of the thrust absorption rods may also be reduced, which advantageously leads to a gain in terms of the overall weight and size of the engine attachment.

Furthermore, the design of the main body proposed by the invention resolves the safety problem observed with the bolt used in the embodiments of the prior art in order to ensure the geometry of the bearing of the hinge pin. In fact, using two portions of pin that jointly compose the first hinge pin permits this safety to be achieved, which is also called a "Fail Safe" function.

It is also pointed out that the absence of a major difference in thickness in the attachment body allows the transfer of the efforts in the engine attachment to be significantly improved.

Finally, given that the first and second main braces jointly define a stop limit surface capable of limiting the rotation of the rudder around the first hinge pin, in the event of breakage of one of the two thrust absorption rods or of a connecting pin between these rods and the rudder bar or the engine housing, the amplitude of rotation of this rudder bar will be advantageously limited by the stop limit surface provided for this purpose.

Preferably, the first and second portions of pin forming the first hinge pin are each semi-cylindrical in shape, and have a semi-circular section.

Preferably, the first and second main braces are superimposed in a transversal direction of the engine attachment.

Furthermore, the engine attachment preferably further comprises a second hinge pin orientated in a longitudinal direction of this engine attachment.

In this case, the second hinge pin can also be composed of a first portion of pin and a second portion of pin, wherein the first portion of pin is made in one piece with the first main brace, and the second portion of pin is made in one piece with the second main brace.

Consequently, the second hinge pin thus formed can cooperate with a triangular brace that is part of the engine attachment, in the aim of absorbing the efforts exerted in the transversal and vertical directions of the engine.

Preferably, the first and second main braces are in contact on a junction surface that is part of a longitudinal symmetry plane of the engine attachment.

Preferably, the attachment is designed to form a front attachment of the assembly system.

Finally, as already mentioned above, the engine attachment is preferably designed so that it absorbs the efforts exerted in direction parallel to the longitudinal axis of the engine, in a direction transversally orientated with respect to this engine, and in a vertical direction with respect to the latter, wherein these three directions are orthogonal to one another.

Furthermore, another object of the invention is an assembly system designed to be mounted between a rigid structure of an attachment strut of an aircraft engine and an engine, wherein this system comprises an engine attachment as described above, and preferably a front engine attachment such as that described above, as well as a rear engine attachment.

Other advantages and characteristics of the invention will become clear in the non-restrictive detailed description below.

BRIEF DESCRIPTION OF THE DRAWINGS

This description will be made in reference to the appended drawings in which.

DETAILED DESCRIPTION OF PREFERRED EMBODIMENTS

Figure 3:
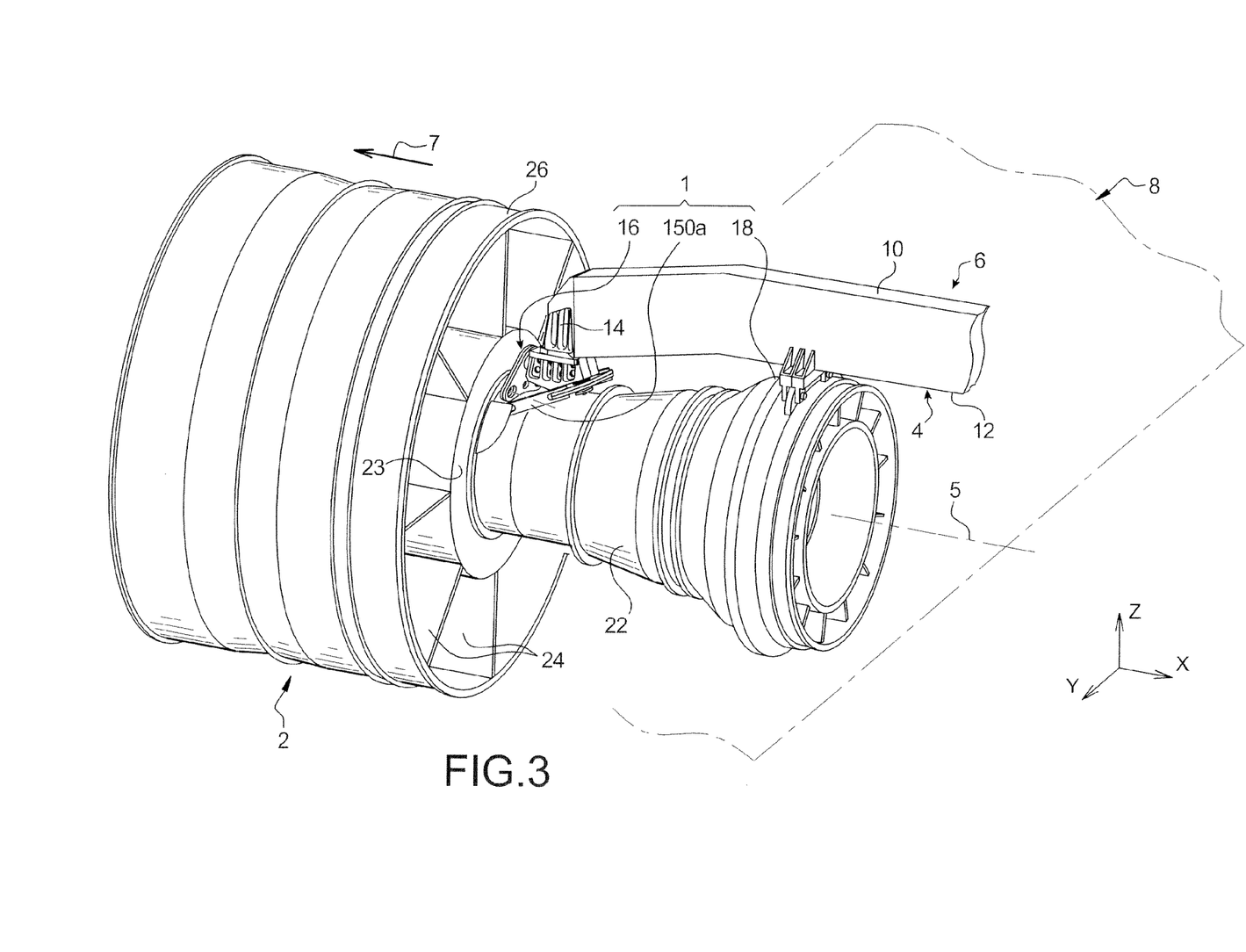
FIG. 3 shows a perspective view of an assembly system mounted between an aircraft engine and a rigid structure of an attachment strut fixed underneath a wing of this aircraft, in one preferred embodiment of this invention.

In reference first of all to FIG. 3, an assembly system 1 in one preferred embodiment of this invention is shown, wherein this assembly system 1 is mounted between an aircraft engine 2 and a rigid structure 4 of an attachment strut 6 fixed underneath the wing of an aircraft that is only shown diagrammatically for obvious reasons of simplicity, and generally designated by the numerical reference 8. It should be noted that the assembly system 1 is adapted to cooperate with a turbojet engine 2, but of course it could also operate with a system designed to hold any other type of engine, such as a turboprop engine, within the scope of the invention. Furthermore, the application of the assembly system 1 is not restricted to the example shown in FIG. 3 where the engine 2 is designed to be suspended underneath the wing 8 of the aircraft.

In the entire description below, by convention, the longitudinal direction parallel to the longitudinal axis 5 of the engine 2 will be called X, the direction orientated transversally with respect to this engine 2 Y, and the vertical direction Z, wherein these three directions are orthogonal to one another.

Furthermore, the terms "front" and "rear" are to be considered with respect to a direction in which the aircraft moves following the thrust exerted by the engines 2, wherein this direction is shown diagrammatically by the arrow 7.

As can be seen in FIG. 3, only one portion of the rigid structure 4 of the attachment strut 6 has been shown, obviously accompanied by the assembly system 1 which is an integral part of this strut 6.

The other component elements of this strut 6, which are not shown, such as the means for attaching the rigid structure 4 under the wing 8 of the aircraft, or even the secondary structure which provides the segregation and maintaining of the systems whilst supporting the aerodynamic fuselage, are classic elements identical or similar to those found in the prior art, and known to those skilled in the art. Consequently, no detailed description will be provided.

In a known manner, it is stated that the rigid structure 4 is formed on the whole by the assembly of lower 12 and upper 10 beams connected to one another by a plurality of transversal ribs (not shown). Furthermore, one front part of this rigid structure 4 is composed by a pyramid 14 or similar, also known to those skilled in the art and in the form of a structure starting at a base and extending to the top towards the front and approaching the longitudinal axis 5 of the engine 2.

In the preferred embodiment of this invention shown in FIG. 3, the assembly system 1 firstly comprises a front attachment 16 integrating thrust absorption rods 150a, 150b (only the rod 150a is visible in this FIG. 3), also called short rods, as well as a rear attachment 18. As concerns this, it is stated that the rear attachment 18 is of the classic type and known to those skilled in the art. Consequently, it will only be described succinctly, by way of example and nonrestrictively.

This rear attachment 18 is on the one hand attached to a rear part of the central housing 22, and on the other hand attached to a lower beam 12 of the rigid structure 4 of the strut 6. Furthermore, it may be formed on the whole by shackles and braces, and absorbs the efforts in the directions Y and Z, as shown diagrammatically by FIG. 3a.

As concerns the front attachment 16 which will be described in more detail below, on the one hand it is attached on the whole to a part of the front end of the pyramid 14 of the rigid structure 4, which is to say its top, and on the other hand attached to one front part of a central housing 22 of the engine 2. More precisely, the front attachment 16 cooperates with one portion 23 of the central housing 22 which supports fixed blades 24 connecting an aeration housing 26 of the engine 2 to this same central housing 22. Furthermore, it is designed to absorb, in particular via the two thrust absorption rods 150a, 150b, the efforts in the directions X, Y and Z, as shown diagrammatically in FIG. 3a.

Figure 3A:
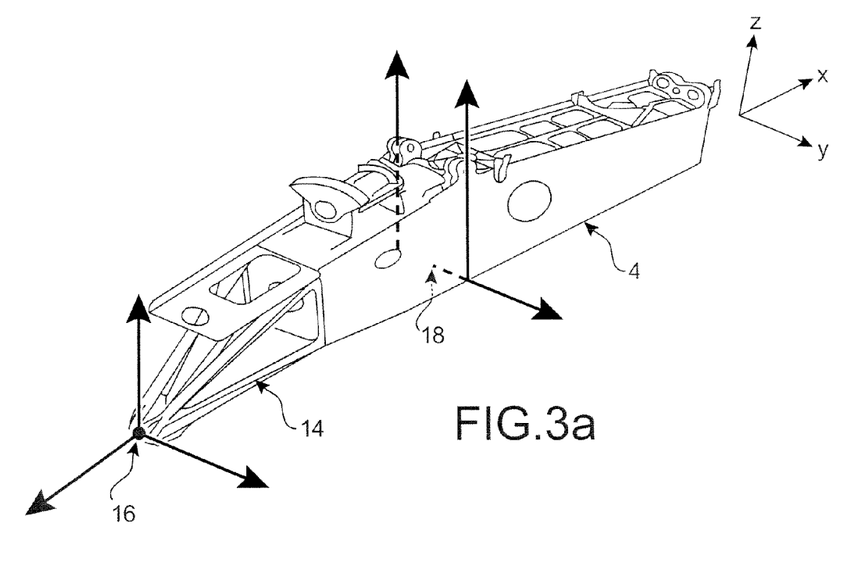
FIG. 3a is a diagrammatical perspective view showing the absorption of the efforts by each of the two engine attachments of the assembly system shown in FIG. 3.

Consequently, the absorption of the torque exerted in the direction X is performed solely by the rear attachment, whilst the absorption of the torques exerted in the directions Y and Z is performed jointly by these two engine attachments 16, 18.

Figure 4:
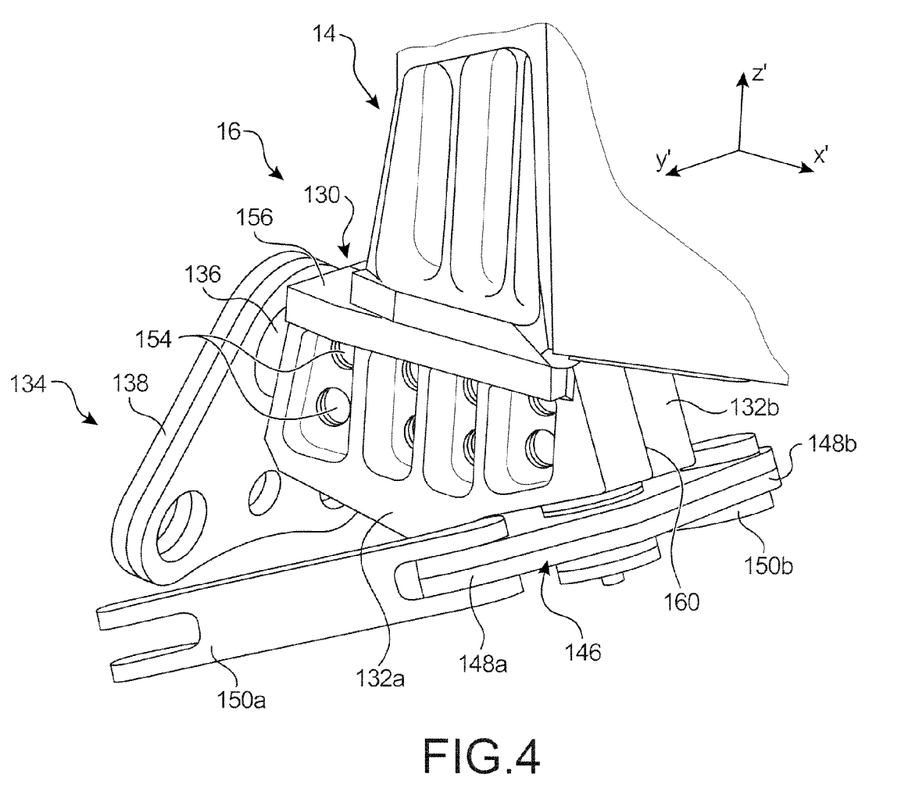
FIG. 4 shows a perspective view of an engine attachment in one preferred embodiment of this invention, wherein this engine attachment corresponds to the front attachment of the assembly system shown in FIG. 3.

Now, in reference to FIGS. 4 to 6, the front engine attachment 16 according to one preferred embodiment of this invention will be described in detail. Still by convention, the longitudinal direction of the attachment 16 will be called X', the transversal direction of the latter Y', and the vertical direction Z', wherein these three directions are orthogonal to one another. Furthermore, these X', Y' and Z' directions may be considered as identical to the X, Y and Z directions previously mentioned, respectively.

The engine attachment 16 generally comprises a main body 130 composed of a first main brace 132a and a second main brace 132b superimposed on the first in the Y' direction, wherein the two braces 132a, 132b are rigidly assembled to one another, for example by means of transversal bolts (not shown) traversing the orifices 154 provided for this purpose.

The two braces 132a, 132b jointly define an upper flat surface 156 orientated in a plane X'Y', wherein this surface 156 is assembled under a lower portion of the pyramid 14 of the attachment strut 4, also using vertical bolts (not shown) traversing the orifices 158 provided for this purpose.

Figure 5:
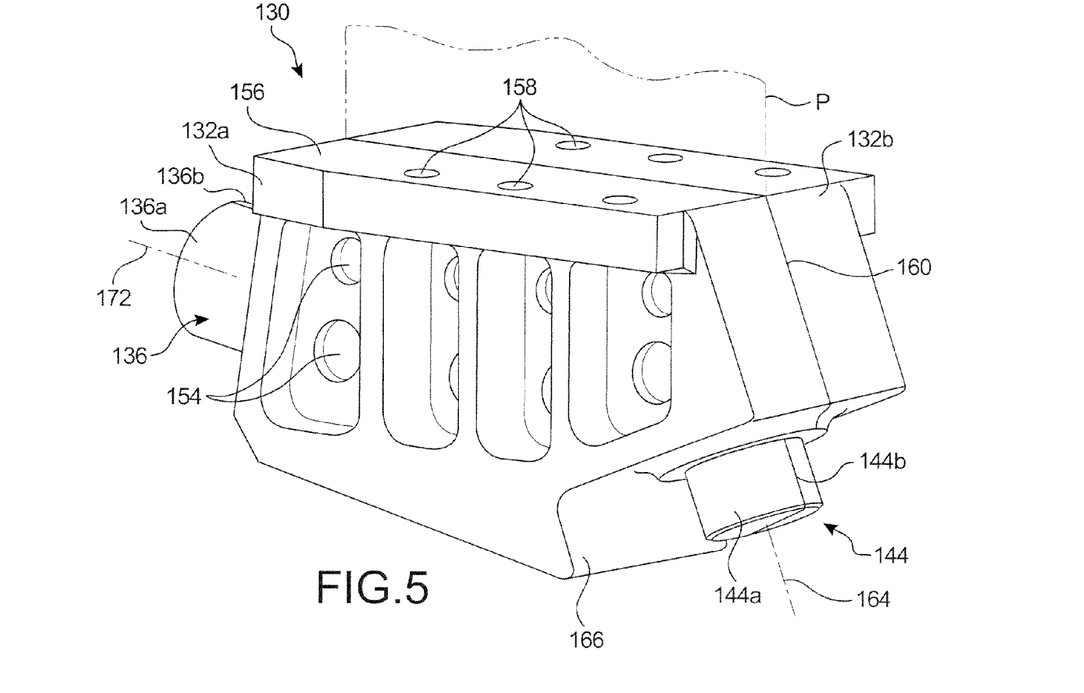
FIG. 5 shows a perspective view of the main body of the attachment shown in FIG. 4.
Figure 6:
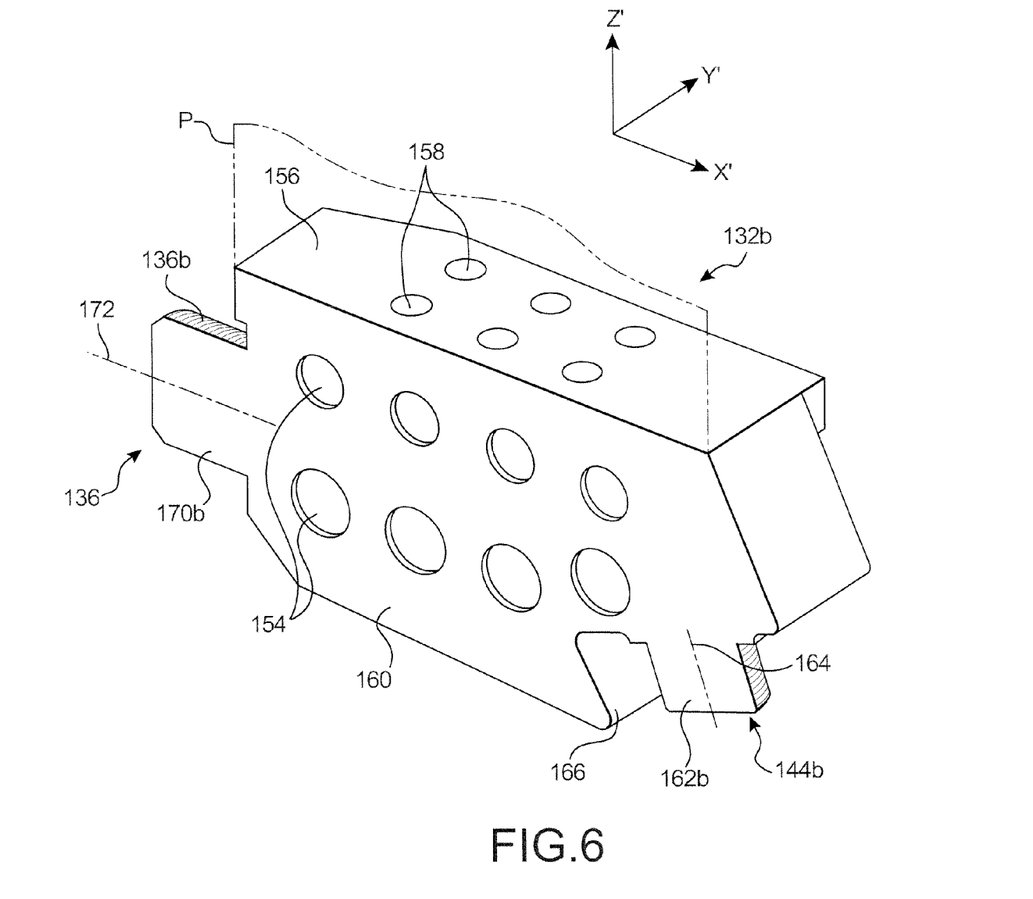
FIG. 6 shows a perspective view of one of the two main braces of the main body shown in FIG. 5.

As can be seen from FIGS. 5 and 6, a flat junction surface 160 between the two braces 132a, 132b is in a plane X'Z' corresponding to a plane of longitudinal symmetry P of the front engine attachment assembly 16, wherein this plane P is such that it passes via the axis 5 of the engine 2.

This front attachment 16 comprises the two thrust absorption rods 150a, 150b positioned on either side of the axis 5 of the engine 2, and each comprises a front end designed to be connected to the portion 23 of the central housing 22.

Moreover, the rear end of each rod 150a, 150b is known to those skilled in the art and is connected to one end 148a, 148b of a rudder bar 146 in the form of a double brace, and articulated around a first hinge pin 144.

One of the specific features of the invention lies especially in the fact that this first hinge pin 144 is made by means of two portions of pin 144a, 144b, as can be seen more clearly in FIGS. 5 and 6. More precisely, this first hinge pin 144 is thus composed of a first portion of pin 144a with a semi-cylindrical form and made in one piece with the first main brace 132a, as well as by a second portion of pin 144b also semi-cylindrical, and made in one piece with the second main brace 132b.

These two portions of pin 144a, 144b with a semi-cylindrical form each have a flat surface 162b in contact with the other (the flat surface of the portion of pin 144a is not visible in the figures), wherein these flat surfaces 162b are part of the plane of symmetry P.

Moreover, the two portions of pin 144a, 144b form the first hinge pin so that the latter is orientated along an axis 164 located in the plane of symmetry P.

The assembly comprising the rods 150a, 150b, the rudder bar 146 and the first hinge pin 144 thus form one part of the front engine attachment 16 that is capable of absorbing the efforts exerted in the direction X of the engine 2, wherein these efforts are essentially thrust efforts generated by the latter.

Furthermore, it is pointed out that the first hinge pin 144 is located on a rear part of the main body 130. At the level of this rear part, the first and second main braces 132a, 132b jointly define a stop limit surface 166 positioned further forward with respect to the hinge pin 144, wherein this stop limit surface 166 is capable of limiting the rotation of the rudder bar 146 around the hinge pin 144 in the event of one of the two rods 150a, 150b breaking or a pin providing the articulation for the latter breaking. Consequently, it should be understood that the surface 166 is positioned with respect to the hinge pin 144 so as to be able to form a stop for the rudder bar 146, when the latter is subjected to angular displacement to a predetermined value.

Moreover, the front part of the main body 130 is fitted with a Monoball type layout known to those skilled in the art, comprising a second hinge pin 136 attached to the main body 130, as well as a double triangular brace 138 articulated at one top of this pin 136. Again in a known manner, the two other tops of this triangular brace 138, located lower than that cooperating with the hinge pin 136, are designed to have an articulated connection to the portion 23 of the central housing 22.

This second hinge pin 136 is made by means of two portions of pin 136a, 136b, as can be seen more clearly in FIGS. 5 and 6. More precisely, this second hinge pin 136 is thus composed of a first portion of pin 136a with a semi-cylindrical form and made in one piece with the first main brace 132a, as well as by a second portion of pin 136b that is also semi-cylindrical, and made in one piece with the second main brace 132b.

These two portions of pin 136a, 136b with a semi-cylindrical form each have a flat surface 170b in contact with the other (the flat surface of the portion of pin 136a is not visible in the figures), wherein these flat surfaces 170b are in the plane of symmetry P. Moreover, the two portions of pin 136a, 136b form the second hinge pin 136 so that it is orientated in an axis 172 situated in the plane of symmetry P.

The assembly comprising the second hinge pin 136 and the triangular brace 138 thus form one part of the front engine attachment 16 capable of absorbing the efforts exerted in the directions Y and Z of the engine 2.

Finally, it is pointed out that each of the main braces 132a, 132b may be made by machining or casting, in a steel or titanium type material.

Of course, various modifications may be made by those skilled in the art to the engine attachment 16 and to the assembly system 1 that has just been described, by way of non restrictive examples only. In particular, even if the detailed description only refers to a front attachment for the application of the invention, it should be understood that it also applies to the creation of a rear attachment designed to incorporate a rudder bar for mounting thrust absorption rods.

The invention claimed is:

1. An engine attachment for an assembly system configured to be mounted between a rigid structure of an attachment strut of an aircraft and an engine, the attachment comprising:
   a main body;
   a rudder bar with an articulated mounting on the main body by a first hinge pin; and
   two thrust absorption rods each with a rear end connected to the rudder bar,
   wherein the main body includes a first main brace and a second main brace superimposed on the first main brace,
   wherein the first hinge pin is composed by a first portion of pin and a second portion of pin,
   wherein the first portion of pin is made in one piece with the first main brace and the second portion of pin is made in one piece with the second main brace, and
   the first and second main braces jointly define a stop limit surface configured to limit rotation of the rudder bar around the first hinge pin, the first hinge pin extending from a surface of the first and second main braces that is opposite a surface of the first and second main braces that contacts the attachment strut.

2. An engine attachment according to claim 1, wherein the first and second portions of pin forming the first hinge pin each have a semi-cylindrical form.

3. An engine attachment according to claim 1, wherein the first and second main braces are superimposed in a transversal direction of the engine attachment.

4. An engine attachment according to claim 1, further comprising a second hinge pin orientated in a longitudinal direction of the engine attachment.

5. An engine attachment according to claim 4, wherein the second hinge pin is composed by a third portion of pin and a fourth portion of pin, wherein the third portion of pin is made in one piece with the first main brace and the fourth portion of pin is made in one piece with the second main brace.

6. An engine attachment according to claim 4, further comprising a triangular brace cooperating with the second hinge pin.

7. An engine attachment according to claim 1, wherein the first and second main braces are in contact along a junction surface that is part of a longitudinal plane of symmetry of the engine attachment.

8. An engine attachment according to claim 1, wherein said engine attachment is configured to be a front attachment of the assembly system.

9. An engine attachment according to claim 1, wherein said engine attachment is configured to absorb efforts exerted in a first direction parallel to the longitudinal axis of the engine, in a second direction orientated transversally with respect to the engine, and in a third vertical direction of the engine, wherein the first, second, and third directions are orthogonal to one another.

10. An engine attachment according to claim 1, wherein the stop limit surface is adjacent to the surface of the first and second main braces from which the pin extends.

11. An assembly system configured to be mounted between a rigid structure of an attachment strut of an aircraft and an engine, comprising an engine attachment according to claim 1.

12. An assembly system according to claim 11, said assembly system comprising a front engine attachment and a rear engine attachment, wherein said front engine attachment is said engine attachment.

* * * * *